C. M. O'HARA.
Hand Corn Sheller.

No. 97,109.

Patented Nov. 23, 1869.

United States Patent Office.

CHARLES MELSOM O'HARA, OF BOLIVAR, TENNESSEE.

Letters Patent No. 97,109, dated November 23, 1869.

IMPROVEMENT IN HAND CORN-SHELLER.

The Schedule referred to in these Letters Patent and making part of the same

*To all whom it may concern:*

Be it known that I, CHARLES MELSOM O'HARA, of Bolivar, in the county of Hardeman, and State of Tennessee, have invented a new and useful Improvement in Hand Corn-Sheller; and I do hereby declare that the following is a full, clear, and exact description thereof, which will enable others skilled in the art to make and use the same, reference being had to the accompanying drawing, forming part of this specification.

Figure 1:
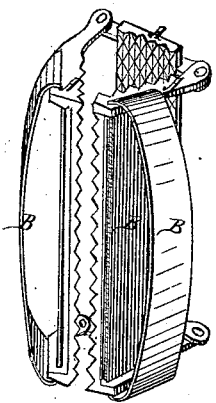
Figure 1 is a perspective view of my invention in a closed condition.
Figure 2:
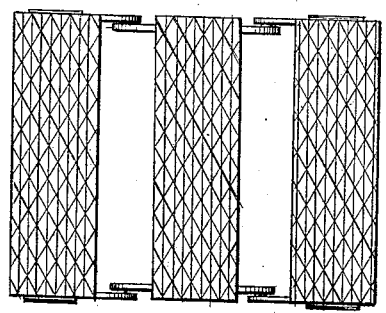
Figure 2 is a face view of the same in an open condition.

My invention relates to hand corn-shellers; and

It consists in the improved construction hereinafter described.

The improvement is in the substitution for the toothed bars or sections hitherto employed, of plates, whose concave interior surface is formed with a series of ridges or corrugations, as hereinafter described.

Hitherto hand corn-shellers have been constructed with bars, which were notched or provided with teeth. This construction is open to serious objection. If the teeth of the bars be "coarse," *i. e.*, not arranged close together, none but the larger kernels will be removed in a single rotation of the ear, since the smaller will pass between the teeth. If, on the contrary, they be made "fine," so many kernels will be at one time in contact with them, or they will have so even a bearing-surface (the rows of teeth entering the grooves or furrows formed between the rows of kernels) as to render it extremely difficult to rotate the ear or the device.

This would evidently be the case if but two toothed bars were used, which is indispensable; whereas, to effect the process of shelling with any desired degree of rapidity, four or more are necessary.

Again, the pressure applied by the hand to the hinged parts of the "sheller," cannot well be graduated, so as to allow the ear to be rotated, since, under any pressure, the rows of teeth will still enter the grooves or furrows, and the difficulty above mentioned remain.

To obviate the same, is the object of my invention; and it consists in a hand corn-sheller, provided with corrugated concavo-convex plates.

In the drawings—

A are metal plates, two, three, or more of which are used, and which are hinged to each other at their edges, by means of ears formed upon said edges.

The plates A are made slightly concave upon their inner sides, and said inner or concave sides are corrugated to enable them to take hold of the kernels to be removed from the cob.

The first and last of the series of plates A have leather straps B attached to them, to receive the hand of the operator, so that they may be closed upon the ear and removed from the cob by the operation of closing and opening the hand.

The sheller may be placed upon one or both hands, as may be desired.

In using the sheller, an ear of corn is grasped with the hand or hands, having the sheller upon them, and by one or two dexterous twists, the corn is removed either wholly or to any desired amount.

By my construction of plates, the whole of the corn, or all the kernels, are brought into contact with them at once, *i. e.*, all that the width of plates enables them to cover, and thus it is seldom necessary to make two twists or revolutions to effect the desired result.

The number of plates may be limited to two with good results, and any preferred width or convexity may be given them, so as to insure a larger bearing-surface or adapt them for corn-ears of greatly varying size, or of different species.

Having thus described my invention,

What I claim as new, and desire to secure by Letters Patent, is—

The improved hand corn-sheller herein described consisting of the hinged plates provided with concave inner surfaces bearing shelling-corrugations, as shown and described.

CHARLES M. O'HARA.

Witnesses:
A. T. McNEAL,
C. H. ANDERSON.